(12) United States Patent
Gracia Verdugo et al.

(10) Patent No.: US 10,183,497 B2
(45) Date of Patent: Jan. 22, 2019

(54) COLOR CORRECTION IN PRINTING SYSTEMS

(71) Applicants: Antonio Gracia Verdugo, Barcelona (ES); Juan Uroz Soria, Terrassa (ES); Oriol Borrell Avila, Sabadell (ES)

(72) Inventors: Antonio Gracia Verdugo, Barcelona (ES); Juan Uroz Soria, Terrassa (ES); Oriol Borrell Avila, Sabadell (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/542,832

(22) PCT Filed: Jan. 30, 2015

(86) PCT No.: PCT/EP2015/051957
§ 371 (c)(1),
(2) Date: Jul. 11, 2017

(87) PCT Pub. No.: WO2016/119886
PCT Pub. Date: Aug. 4, 2016

(65) Prior Publication Data
US 2018/0001658 A1    Jan. 4, 2018

(51) Int. Cl.
*B41J 2/21*   (2006.01)
*H04N 1/60*   (2006.01)
*H04N 1/62*   (2006.01)
*H04N 1/00*   (2006.01)
(Continued)

(52) U.S. Cl.
CPC ........ *B41J 2/2132* (2013.01); *H04N 1/00411* (2013.01); *H04N 1/6027* (2013.01); *H04N 1/62* (2013.01); *B41J 2/362* (2013.01); *G03G 15/0121* (2013.01)

(58) Field of Classification Search
CPC .......... B41J 2/2132; B41J 29/38; B41J 2/045; H04N 1/00411; H04N 1/6027; G03G 15/0121
See application file for complete search history.

(56) References Cited

U.S. PATENT DOCUMENTS

| | | |
|---|---|---|
| 7,324,240 B2 | 1/2008 | Ng |
| 7,505,625 B2 | 3/2009 | Haikin |
| 7,548,343 B2 | 6/2009 | Ng et al. |

(Continued)

FOREIGN PATENT DOCUMENTS

| | | |
|---|---|---|
| CN | 1788486 | 6/2006 |
| CN | 102171051 | 8/2011 |

(Continued)

OTHER PUBLICATIONS

ColorLogic GmbH, ZePrA 3.5—Spot Color Processing, Jan. 23, 2013 (5 pages).

*Primary Examiner* — Thinh H Nguyen
(74) *Attorney, Agent, or Firm* — HP Inc. Patent Department (57) ABSTRACT

A method is described in which a first color is detected at a user-selected arbitrary position of a first print; a second color is detected at a user-selected arbitrary position of a second print printed by a printer; a color difference between the first color and the second color is determined; and settings of the printer are changed to reduce the color difference in further prints printed by the printer.

20 Claims, 6 Drawing Sheets

(51) Int. Cl.
*B41J 2/36* (2006.01)
*G03G 15/01* (2006.01)

(56) References Cited

U.S. PATENT DOCUMENTS

| | | | |
|---|---|---|---|
| 7,680,325 B2 * | 3/2010 | Miwa | G06T 11/001 |
| | | | 382/167 |
| 7,940,393 B2 | 5/2011 | Noy et al. | |
| 2005/0140997 A1 | 6/2005 | Shirasawa | |
| 2012/0147391 A1 | 6/2012 | Bala et al. | |
| 2014/0285832 A1 * | 9/2014 | Miyamoto | H04N 1/60 |
| | | | 358/1.9 |

FOREIGN PATENT DOCUMENTS

| | | |
|---|---|---|
| CN | 103369204 | 10/2013 |
| CN | 103370927 | 10/2013 |
| CN | 104079747 | 10/2014 |
| CN | 104255021 | 12/2014 |
| EP | 1215887 | 6/2002 |
| WO | WO-2005112433 | 11/2005 |

\* cited by examiner

COLOR CORRECTION IN PRINTING SYSTEMS

BACKGROUND

A color printed by a printing system may be affected by different things, for example, aging of components or tolerances between components of a same kind such as printheads and supplies.

Some printing systems may use an ink-jet for transferring color to a print. Some printing systems may use electrostatic forces for transferring color, for example, by a dry toner power or a liquid toner.

BRIEF DESCRIPTION

Examples will now be described, by way of non-limiting example only, with reference to the accompanying drawings, in which.

The examples and description below make reference generally to ink-jet printing systems. Such printing systems may use a printhead to transfer drops of ink to a media. However, the techniques described herein may also apply, with appropriate modifications, to any other printing systems that print any type of printing fluid, such as liquid electrophotographic (LEP) printing systems or dry toner printing systems.

When a printing system is considered as comprising not only the printer itself but also printheads and supplies, differences in colors obtained on the media may be obtained from printing system to printing system within the same or different printers.

As an example, a source of color differences within a printing system may be the aging of a printhead. A weight of an ink drop may vary along the printhead life due to several factors such kogation effects. Further, printhead performance may vary from one to another, for example based on manufacturing tolerances or different aging effects.

Examples described herein provide a method for reducing color differences between a first color and a second color. A color difference may be, for example, a difference between color values, which depends on the printer such as an amount or an intensity of basic colors of the printer. The color difference may also relate to differences between color values independent of devices, such as Lab values.

According to an example, the first color may be obtained by the printing system before an event. The event may be, for example, a change or a modification of a component of the printing system such as a supply or a printhead. The second color may be obtained after the event, for example, when the printer tries to print the same layout. The event may lead to changed colors. Examples described herein allow to reduce the color difference of the printer. The difference may be reduced so far that the printer may print the same or almost the same color before the event and after the correction of the color. The first color and the second color may be detected at a user-selected arbitrary position of the print. The respective print may be inserted to the printer when the user selects the arbitrary positon.

According to another example, the first and the second color may also be obtained by two different printers. Examples described herein allow to reduce the color difference between the printers. The difference may be reduced so far that different printers may print the same or almost the same color.

Other examples described herein may provide a method to print the same or almost the same color at a printer after an above mentioned event and/or without calibrating the printing system.

Other examples described herein may provide a printer to adjust a color to be printed to a color provided to a sensor arrangement of the printer. A color to be adjusted may be selected by a user through a user command indicating a selection of a user-selected arbitrary positon of the print that is provided to (inserted in) the printer.

Figure 1:
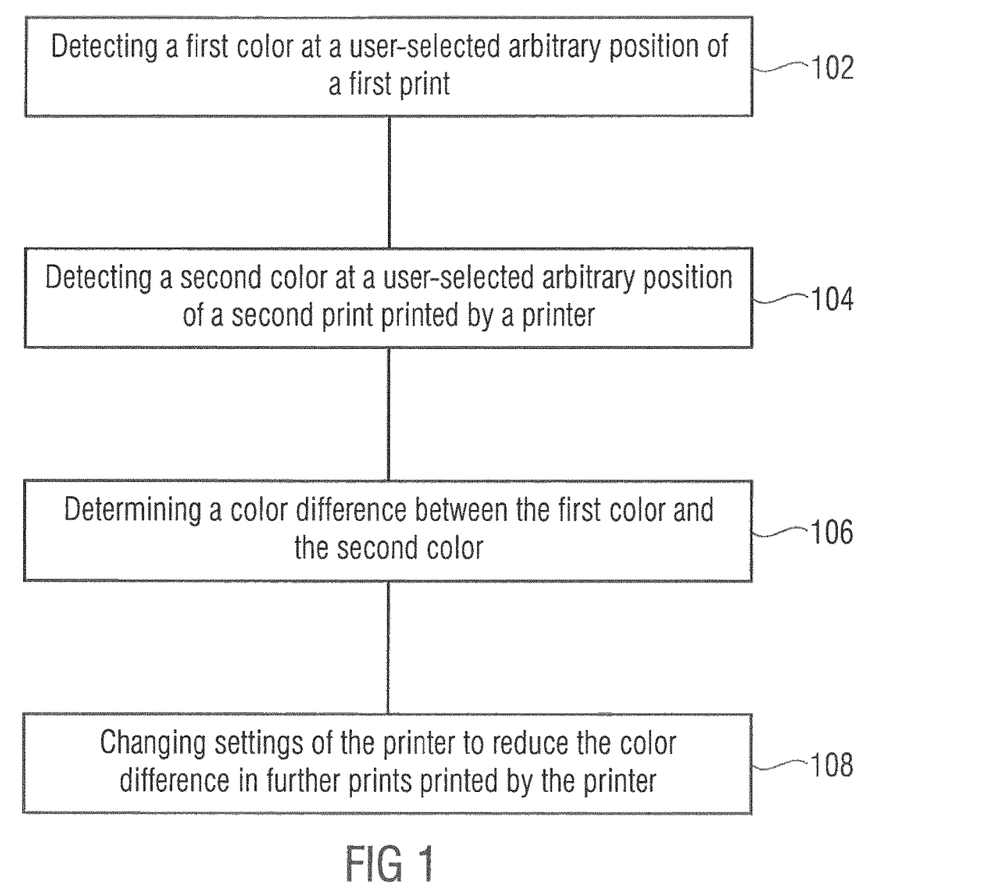
FIG. 1 is a flow diagram outlining a method of reducing a color difference between a first color and a second color according to one example.

Referring now to FIG. 1 there is shown a flow diagram outlining a method of reducing a color difference between a first color and a second color in further prints printed by the printer.

At 102, a first color is detected at a user-selected arbitrary position of a first print. At 104 a second color is detected at a user-selected arbitrary position of a second print. The second print is printed by a printer. The first print may be printed by the printer or by a different (second) printer. At 106, a color difference between the first color and the second color is determined. At 108, settings of the printer are changed to reduce the color difference in further prints printed by the printer. This may include to change (modify) the second color printed by the printer, i.e., to adapt the second color to be more similar to the first color.

The first color and the second color may be detected by a sensor arrangement of the printer. For example, the sensor arrangement may comprise an optical sensor such as a spectrophotometer, a colorimeter, a line sensor or a camera. The sensor may be a system-on-a-chip (SoC). The first color and/or the second color may be obtained as or converted to a device on specific color value (e.g., a Lab or L*a*b* value). The first color and the second color may also be obtained or converted to a device specific color value. A device specific color value may be based on basic colors of the printer such as cyan, magenta, yellow and/or black (CMYK), further and/or different colors printed by the printer. Basic colors may influence a color space of the printer, i.e., colors that may be printed by the printer. A conversion between device unspecific and device specific color values may be performed by using a conversion information such as an ICC (International Color Consortium) table. The color difference may be determined, for example, by relating the Lab values. A relation may be formed by non-limiting examples as a difference or a quotient.

The settings of the printer may be changed, for example, by a controller. The settings may be changed by combining, for example, adding or subtracting, the determined color difference to or from a color value to be printed. According to another example, the settings of the printer may be changed by modifying conversion values such as ICC tables.

In examples described herein, the setting of the printer may be changed such that the second color is changed, i.e., modified or corrected. The color difference after changing the settings of the printer may be lower when compared to the color difference before the change. The color difference after the change may be, for example, at most 70%, at most 50% or at most 30% of the color difference before the change. In some examples, a quotient of an unspecific color value of the first color and a corresponding unspecific color value of the corrected second color may comprise a value between, 3.3 and 0.3, between 2 and 0.5 or between 1.4 and 0.7. In some examples, the color difference may also be expresses by dE-values. The color difference may be at most 10 dE, at most 5 dE or at most 3 dE after changing the setting of the printer. Simplified, the corrected second color may be equal or at least similar to the first color.

The printer may comprise a user interface for receiving the user command or user instructions indicating a change of a position of the sensor arrangement relative to the print inserted in the printer. The user-selected arbitrary position of the first print may be selected by a user by a user command received by the printer at the user interface. For example, the first print may be inserted in the printer. The user may select the user-selected arbitrary position of the first print by guiding the sensor arrangement of the printer to a location on the first print where the first color is printed. The first color may be a color which the user wants to restore or obtain on the printer in further prints. The user-selected arbitrary position of the second print may be obtained, for example, when the second print is inserted into the printer. The user may guide the sensor arrangement to a location of the second print where the second color is printed. The second color may be a color which is intended to be the same color as the first color but differs from the first color.

For example, such a method may be performed partially or completely after an event leading to changes in a color to be printed. The first color and the second color may be printed by the same printer. The second color may be matched to the first color. A change of color due to the event may thus be reduced.

According to another example, the first color and the second print may be printed by different printers. The color of the printer printing the second color may be matched at least partially to the first color printed by the other (second) printer. This may lead to a comparability of prints printed by different printers and with respect to the colors obtained on the prints.

Simplified, examples may provide a method comprising a low complexity, that allows for reproducing colors essentially equal, whatever the status or changes of the system is. This may comprise comparing two samples and performing global transformations for the whole color space (that means that the user selected color may be matched and other colors may change as well).

The same method may be used to make two printers to print the same color, one modifying its color space to match a particular color of the other printer.

Figure 2:
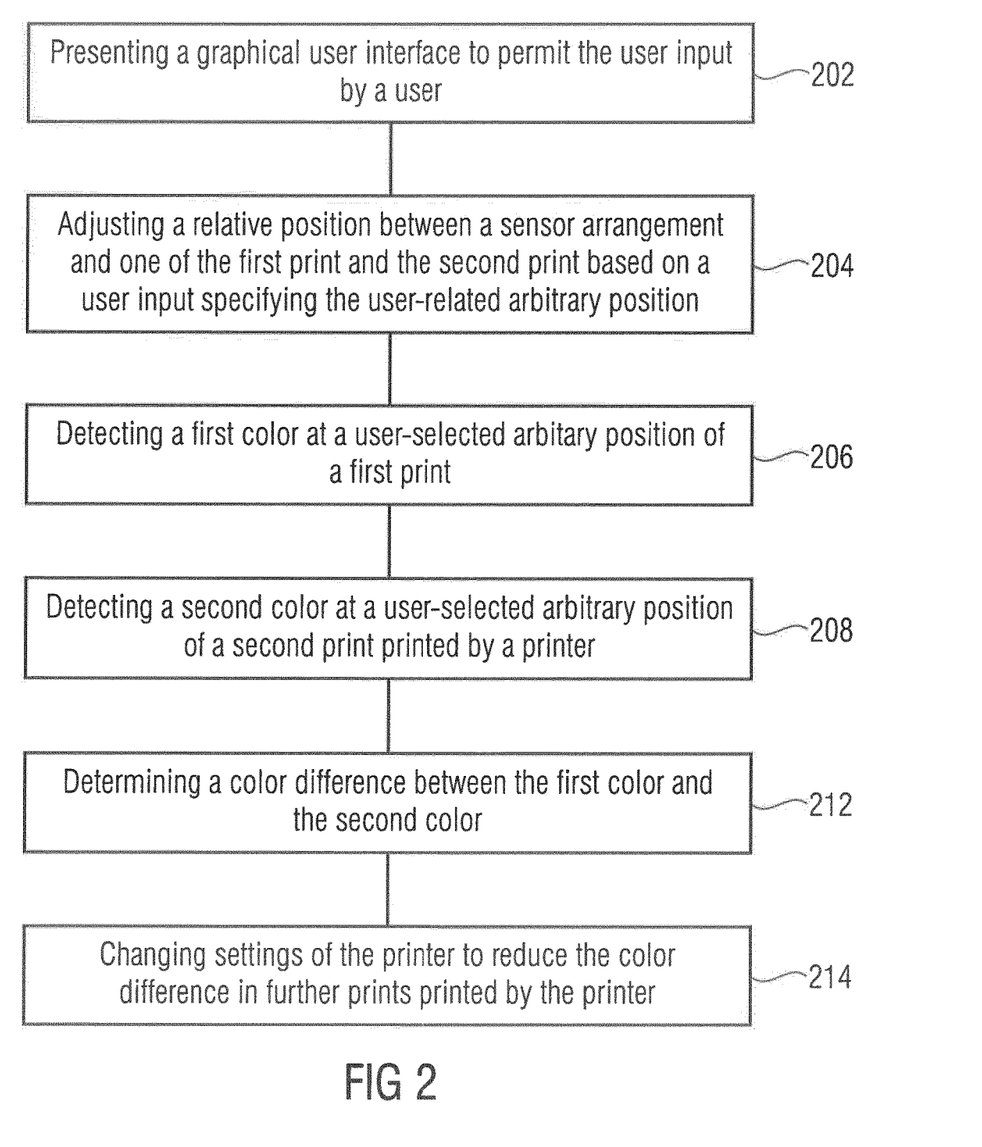
FIG. 2 is a flow diagram outlining a further method of reducing a color difference between a first color and a second color according to one example.

Referring now to FIG. 2 there is shown a flow diagram outlining a method of reducing a color difference between a first color and a second color in further prints printed by the printer.

Figure 3A:
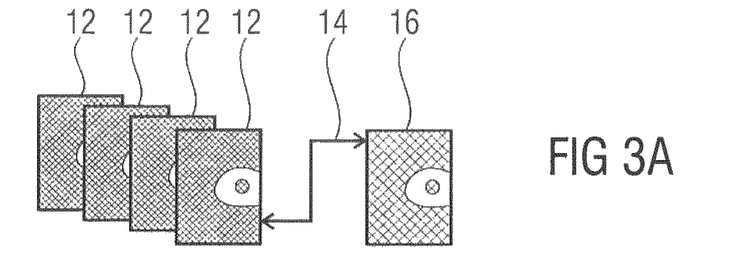
FIGS. 3a, 3b, 3c and 3d are simplified illustrations of a scenario in which a color difference is reduced according to one example.

In 202 a graphical user interface is presented to permit the user input by a user. In 204 a relative position between a sensor arrangement and the first print or the second print is adjusted based on a user input. The user input may specify the user-selected arbitrary position. In 206 a first color is detected at a user-selected arbitrary position of the first print. In 208 a second color is detected at a user-selected arbitrary position of a second print printed by a printer. The first color and the second color may be detected in any order. The first color and the second color may be detected by the same sensor arrangement. The sensor arrangement may be a part of the printer which has printed the second print. In 212 a color difference between the first color and the second color is determined. In 214 settings of the printer are changed to reduce the color difference in further prints printed by the printer 206, 208 and/or 212 may be equal to 102, 104 and 106 respectively Referring now to FIGS. 3a, 3b, 3c and 3d there are shown simplified illustrations illustrating a scenario in which an example according to the teachings disclosed is performed. As illustrated in FIG. 3a, at least one print 12 is printed by a printer. A change or a modification during an event 14 may lead to a change in color. A print 16 may comprise a different (second) color when compared to the print 12 comprising the first color.

Figure 3B:
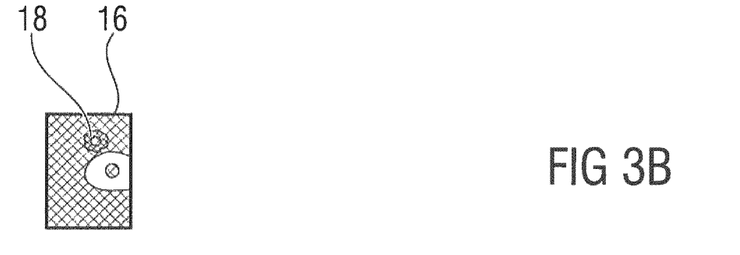
Figure 3C:
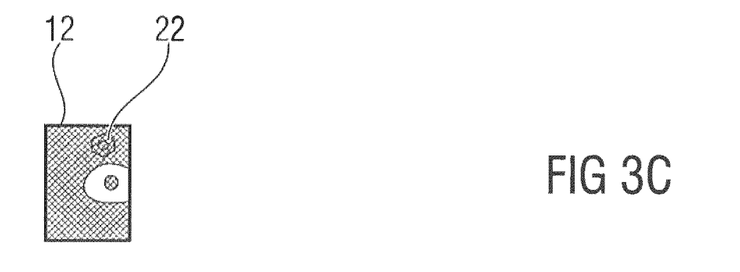

As illustrated in FIG. 3b, the color of the print 16 may be detected at a user-selected arbitrary position 18 of the print 16. As illustrated in FIG. 3c the color of the print 12 may be detected at a user-selected arbitrary position 22 on the print 12. The user-selected arbitrary position 18 and the user-selected arbitrary position 22 may be equal or equal within a tolerance range. In examples, the user-selected arbitrary position 18 of the print 16 and the user-selected arbitrary position of the print 12 may be regions of the respective print, intended to have the same color.

Figure 3D:
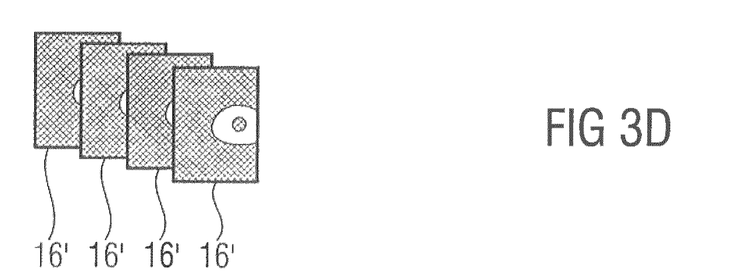

As illustrated in FIG. 3d, after changing the settings of the printer, the printer may print modified prints 16' comprising a color having a reduced color difference to the color of the print 12 when compared to the color of the print 16.

In examples, the prints 12, 16 and 16' may be printed by the same printer. The color difference between the color of the prints 16' and the prints 12 may be reduced when compared to the color difference between the print 16 and the prints 12.

In other examples, the prints 12 are printed by a printer and the prints 16 and 16' are printed by a different printer. The color of the print 12 and the color of the print 16 may be detected by the printer printing the prints 16 and/or 16'. A color difference between prints printed by different printers may thus be reduced.

In examples, the color of the print 16 is detected before the color of the print 12 is detected. In other examples, the color of the print 12 is detected before the color of the print 16 is detected. In other examples, a user interface is provided to a user permitting the user to select which color shall be detected first.

Figure 4:
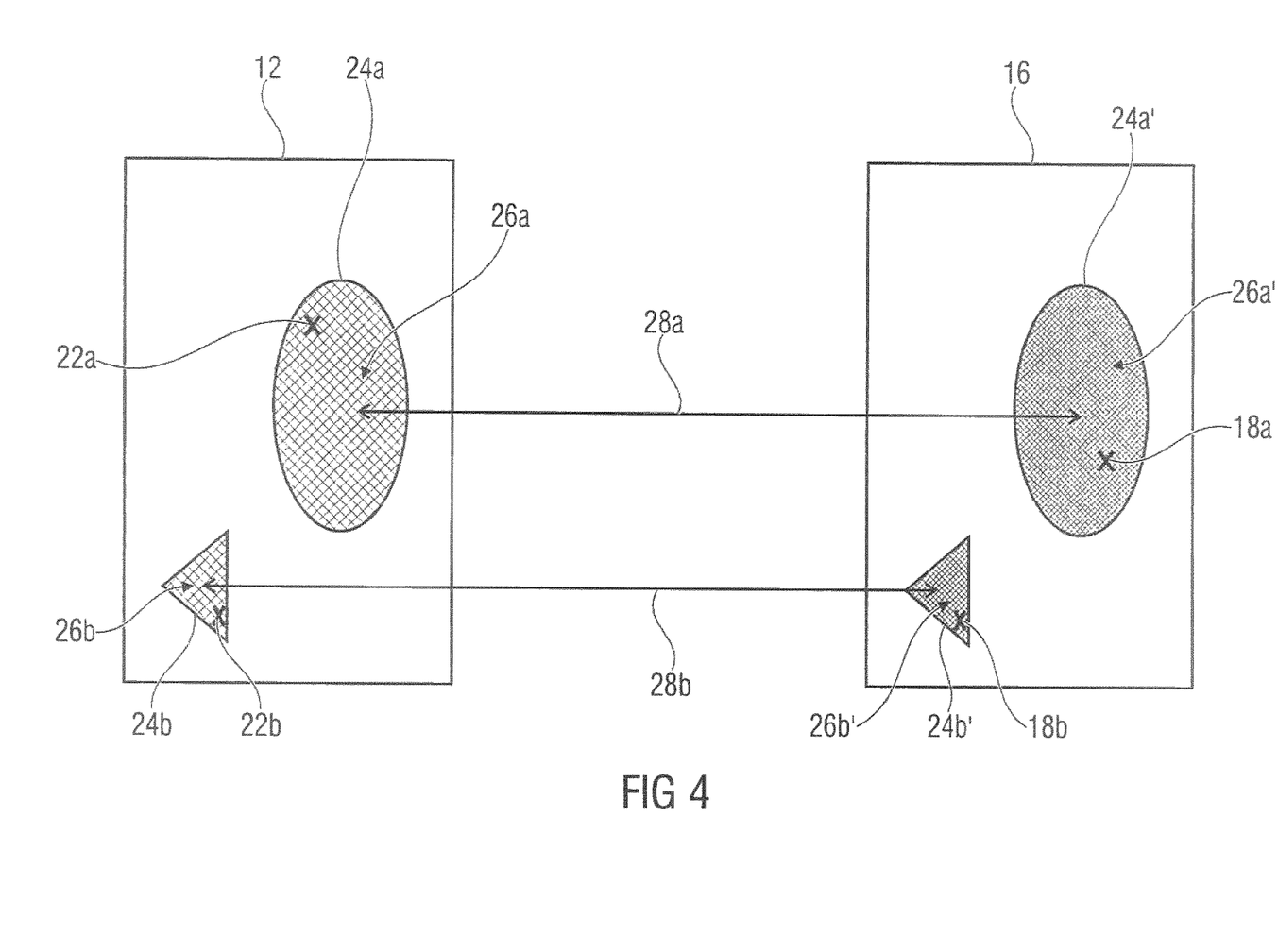
FIG. 4 is a simplified illustration of a first print and a second print 16 is shown according to one example.

Referring now to FIG. 4 there is shown a simplified illustration of the (first) print 12 and the (second) print 16. The first print 12 comprises a first region 24a and a third region 24b. The second print 16 comprises a second region 24a' which may correspond to the first region 24a and a fourth region 24b' which may correspond to the third region 24b. The first region 24a and the second region 24a' are intended to have the same color. The third region 24b and the fourth region 24b' are intended to have the same color. Simplified, the print 12 and the print 16 may have the same or a comparable layout. In examples, the user-selected arbitrary position 22a and/or 18a may be located at different regions when compared to each other, the different regions intended to have the same color. Simplified, any location may be selected as the user-selected arbitrary position comprising the intended color.

The third color may be determined at a user-selected arbitrary position 22b. The fourth color may be determined at a user-selected arbitrary position 18b. The user-selected arbitrary positions 18b and 22b may differ from each other as described for the user-selected arbitrary positions 18a and 22a or may be equal.

For example, the user-selected arbitrary position 18b or 22b selected first may be stored (e.g., as an absolute coordinate or a vector) and used to guide the sensor arrangement to this position at the other print 12 or 16.

A first color 26a at the first region 24a may be different from a corresponding second color 26a' at the second region 24a' of the print 16. A color difference 28a between the color 26a and the color 26a' may be determined. In examples, the color difference 28a may be reduced in further prints of the printer. In some examples, in addition, a further color difference 28b between a third color 26b printed in the region 24b and a fourth color 26b' printed in the region 24b' may be determined and reduced in the further prints printed by the printer.

Changing or correcting the color 26a' or 26b' may each lead to a modification (global transformation) of the color space of the printer. However, examples described herein may be used to correct any number of colors. For example, a color difference determined for the first (or second) and/or for the third (or fourth) color may be stored in a memory of the printer. When the printer prints the respective color a color-specific correction may be performed. For example, a number of colors may be corrected (e.g., sequentially). Colors corrected after may influence the colors corrected previously, wherein the color difference before correcting the respective color may still be reduced when compared to the color difference before correction. According to other examples, the determined color difference (or a value related thereto) for the colors to be corrected may be stored in the printer, e.g., in a memory. This may allow for obtaining a corrected color for each of the corrected color. When the printer prints one of the colors corrected, it may obtain the color difference (or the value related thereto) such that the corrected color is printed.

A user-selected arbitrary position 22a of the print 12 may differ from a user-selected arbitrary position 18a of the print 16 when referring to coordinates on the respective print but may be within the respective region 24a, 24a' respectively.

Figure 5:
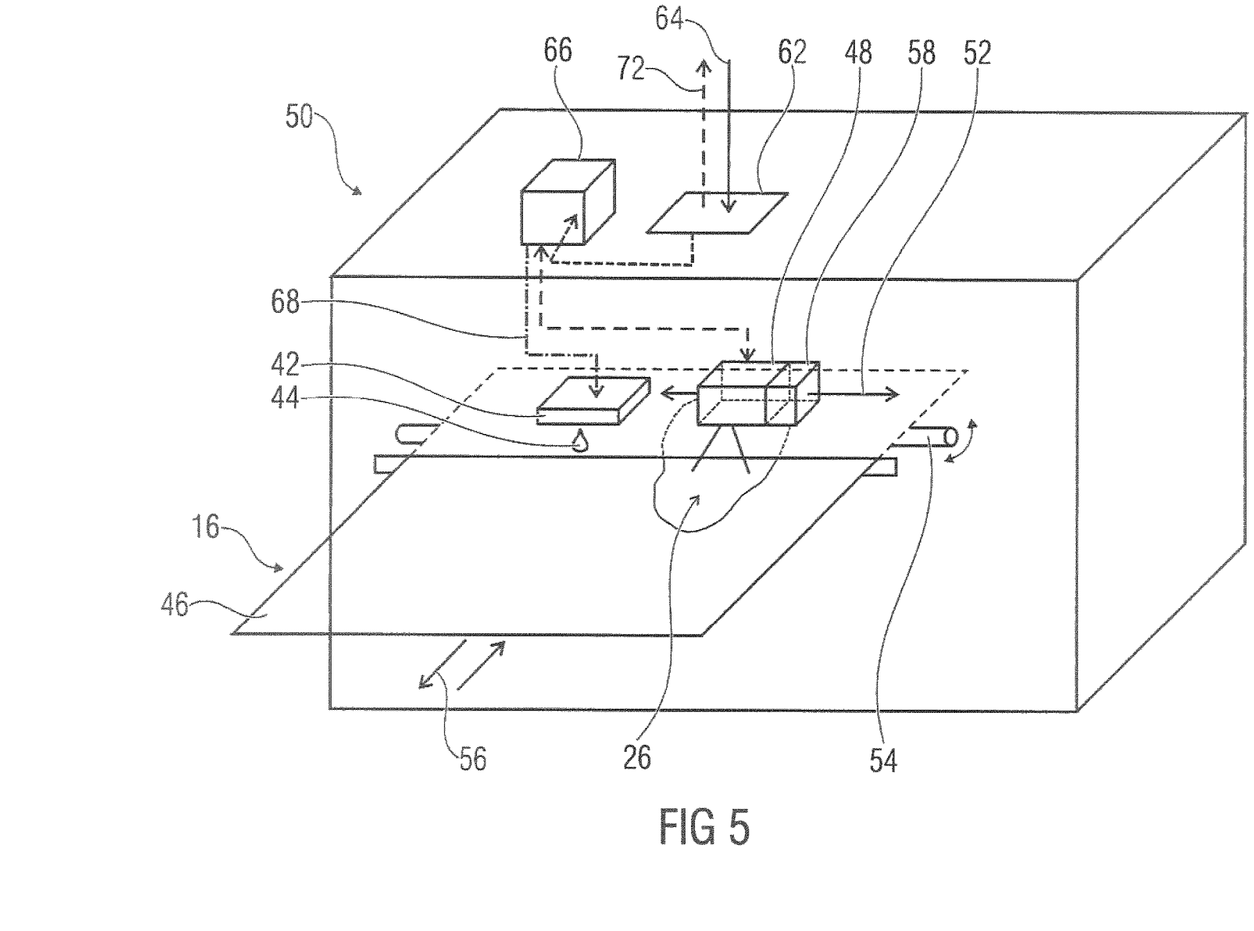
FIG. 5 is a block diagram of a printer according to one example.

Referring now to FIG. 5 there is shown a block diagram of a printer 50 according to one example. The printer 50 may comprise a printhead 42 for printing (depositing) ink 44 on a media 46 to obtain the print 16. In other examples, the printer 50 may comprise other components for applying dry toner powder or liquid toner to the media 46.

The printer 50 comprises a sensor arrangement 48 to detect a color 26 of the print 16. A position of the sensor arrangement 48 relative to the print 18 may be adjustable, for example, along a direction 52. The printer 50 may comprise an actuator 54 to transport the print 16 along a direction 56 (or along an opposite direction). The direction 56 may be a paper axis of the printer 50. The direction 56 may be different, for example, oblique or perpendicular with respect to the direction 52.

The printer 50 may comprise an actuator 58 to move the sensor arrangement 48 along the direction 52 (or in an opposite direction). The sensor arrangement 48 may be arranged adjacent to the printhead 42. In examples, the printhead 42 and the sensor arrangement 48 are moved commonly by the actuator 58.

The printer 50 may comprise a user interface 62 enabling a user to adjust a relative position between the sensor arrangement 48 and the print 16 and to select this relative position as a user-selected arbitrary position. For example, a user command 64 may be received by the printer 50 at the user interface 62 indicating to move the sensor arrangement 48 along the direction 52 and thus to change a relative position of the sensor arrangement 48 with respect to the print 16. The user command 64 may indicate to move the print 16 along the direction 56 or along a different, e.g., opposite, direction and thus to change a relative position of the print 16 with respect to the sensor arrangement 48. The user command 64 may comprise information indicating that a current relative position is selected as a user-selected arbitrary position of the print 16.

The sensor arrangement 48 may be selectively moved by the actuator 58 with respect to the print 16 along the direction 52 based on a user input in the user interface 62. The print 16 may be moved selectively with respect to the sensor arrangement 48 along the direction 56 based on a user input in the user interface 62.

The actuators 54 and/or 58 may be controlled by a controller 66 of the printer 50. In examples, the controller 66 may be a CPU of the printer 50. In examples, the controller 66 may determine a color difference between the color 26 and a corresponding color of a different print. For example, the controller 66 may receive information related to the color 26 and/or the other color from the sensor arrangement 48. The information may comprise device unspecific color values or device specific color values, for example, a Lab value and/or a color value related to the (basic) colors printed by the printer 50 such as a CMYK value.

Settings of the printer may be changed by the controller 66, for example by modifying an information 68 controlling a color of the ink 44 printed by the printhead 42.

In examples, the user interface 62 may provide information 72 to the user. The information may indicate the position of the sensor arrangement 48 relative to the print 16. The information may, for example, comprise a presentation of a portion of the print 16. Simplified, a picture obtained by the sensor arrangement 48 may be presented to the user. The information 72 may also comprise a presentation of a portion of the print 16 at which the sensor arrangement 48 is located. For example, this may be a graphical presentation of the current relative position on the print 16. In examples, the printer 50 comprises a graphical user interface to receive the user command 64 and to display information at which position the sensor arrangement 48 is arranged at the print 16 and/or which color is detected or present at the position.

Simplified, the user may guide the print and/or the sensor arrangement to a position at which the sensor arrangement detects the color to be corrected and may indicate this position as user-selected arbitrary position. The sensor arrangement may measure the actual color, for example, as a CMYK value or Lab value. Accordingly, the user may guide the media and/or the sensor arrangement to a position of the print showing the color to be obtained. A second CMYK value or Lab value may be obtained by the sensor arrangement at the arbitrary position of the print, the arbitrary position selected by the user. The printer may start the calibration process to try to match those color values. This may lead to a global transformation of the color space of the printer instead of a segmentation of color.

In examples, the user may correct a color based on the following way. For example, the user changes a supply and/or a printhead in the middle of a production of prints, e.g., advertising, that uses a specific color such as a corporate color. The user may realize that he or she cannot get the same color after the change of the supply or printhead. For example, the original color anchor point of the printer may have changed slightly or a lot when no printer calibration has previously been performed. Thus, the colors may not match and have a color difference. The user may guide the media (print) and/or the sensor arrangement, e.g., a printer carriage with embedded spectrophotometer, to a spot (region). Measured (detected) spot colors, i.e., colors at regions or spots of the print may be obtained by taking corresponding Lab measures on a desired color or on desired colors. This may be the colors obtained before the change. In examples settings of the printer may be changed by modifying internal ICC tables of the printer. For example, the controller may to try to match the desired colors with the current system, i.e., after the change, by adding or subtracting Lab differences.

The differences between the colors may be expressed as a difference in Lab values. In examples, the controller of the printer may receive or determine the Lab value (Lab1, Lab2) of the colors of the user-selected arbitrary position of both prints which may be expressed as:

Lab1−Lab2=ΔLab.

ΔLab may correspond or relate to the determined color difference. The sensor arrangement may determine or measure a (device specific) color value indicating the color printed by the printer. The color value may be transformed to a current unspecific color value, for example, using the printers ICC tables which may be represented as Current color value−ICC−current Lab.

The current Lab (value) may be understood as a color to be printed. The determined color difference may be combined with the current unspecific color value. A combined unspecific color value may be transformed to a corrected specific color value, for example, by using the ICC table which may be represented by Current Lab±ΔLab−ICC−corrected color value.

I.e., a color to be printed may be adapted based on the determined color difference. The representation above could mean that the determined color difference ΔLab may be added to or subtracted from the current Lab value.

When compared to a calibration for calibrated printers, these may involve usage of ICC profiles which characterize the relationship between a device native ink space and a device-independent color space. The calibration may require a printing of some standard characterization chart, e.g., according to ECI 2002, IT8.7/4 and may consist of several (maybe hundreds) of colors etc. A further measurement with a spectrophotometer or a colorimeter may be used to build this relationship.

For example, when the system is characterized way, the gamut (i.e., an amount of colors the device can reproduce) may be measured at a given moment and printer status (reference condition). If some variation occurs and the system characteristics change, the gamut may also be affected, thus, performing regularly a color calibration may ensure the printer to come back to that reference condition. When a color calibration process is triggered, a subset of colors (normally consistent on different densities of primaries and secondary colors) may be printed, measured, and compared to the reference to bring back the printer to its first characterized status for the whole gamut.

However, if the system has not been or may not be calibrated such that there is no reference to make the printer to come back to, the (known) color calibration process may be useless, and a new characterization process needs to be performed to make a new start point. This may lead to colors that may differ at least a little or even may be unacceptable for a user. A calibration obtained by examples described herein, may not require a calibration to be performed and may allow for matching of colors even after a change of the system or between different printers.

In other examples, the determined color difference ΔLab may be combined with the ICC tables, for example by adding or subtracting the value. I.e., a conversion information defining a conversion of the color to be printed into a color space of the printer may be changed. The setting of the printer may thus be, as non-limiting example, the color to be printed or the conversion information. Simplified, the colors may be detected as Lab value or an information related to basic colors of the printer. Lab values may be determined based on the information related to the basic colors of the printer and based on a conversion information. Simplified, conversion may be performed with a corrected conversion input and/or conversion may be performed with a corrected conversion information.

Further prints may be printed with the corrected extra accuracy on the spot color, i.e., the color of the user-selected arbitrary position.

In examples, a dialog may be provided to the user, for example, by a (graphical) user interface. The dialog may ask the user to move the media showing the color to be obtained in paper axis direction for reading position. The paper axis direction may be, for example parallel to the direction 56 depicted in FIG. 5, for reading position. The reading position may be, for example, the print zone of the printer. The print zone may be understood as a zone (region) printable or measurable with the printer (sensor arrangement) without moving the media. The dialog may ask the user to place the sensor arrangement over the desired color to be measured. In examples, this may be performed when the media is in place along the paper axis direction. When the sensor arrangement is in place, i.e., the user-selected arbitrary position is selected, the sensor arrangement may take a sample or samples of the color (color measurements).

The ICC value used to print this color(s) may be determined and/or stored, for example, as a target Lab value. After a change of the system, the color may not be the same, for example, when there has not been any color calibration. A new measurement as described above may be performed to obtain a new Lab value. Both Lab values may be compared to make the corrections and to try to correct the new (wrong) value to the desired (stored target) one.

According to other examples, the measurements may be performed in a different order and/or after the event.

A high accuracy of matching user selected spot colors may be obtained, for example, in terms of a specific color obtained over a long time. This may include modifications of the printing system. There may be no need of a color calibration to match the specific color. Corrections may be performed based on the measured Lab differences, e.g., printed versus target.

In examples, a color correction as described above may be performed at printers which are not calibrated. This may be, for example, if calibration of the printer was not performed (skipped) or is not provided by the printer. A particular color or a set of colors obtained in a given moment may be maintained at least essentially. Examples provide a functionality to analyze, possibly to store results for future references and to apply corrections to the printing system. Corrections may fee achieved by matching colors to maintain a printed color even if the printing system changes. In other examples, extra accuracy is provided over the printer to printer color variability by matching same colors (colors intended to be equal) between different printers. Examples provide a printer method for spot color proving on non-color calibrated printers.

In examples, an information related to the first color may be stored in a memory of the printer. The information related to the first color may be the color used to print the first color (e.g., a CMYK value), a corresponding Lab value, the measured color difference to the second color or the second color itself. After a further event (further change of the printer system) or at a further printer a further color may be detected at a user-selected arbitrary position of a further print. The further print may be printed by the printer or the further printer. Settings of the printer related to the first color may be changed to reduce a difference between the further color and the first color in further prints printed by the respective printer. The color difference between the further color and the first color may be determined based on the further color and the stored information relating to the first color. Simplified, after a further change of the printing system the stored information may be used as an anchor point. After the further change the color difference between the further color and the first color may be reduced without detecting the first color again.

Figure 6:
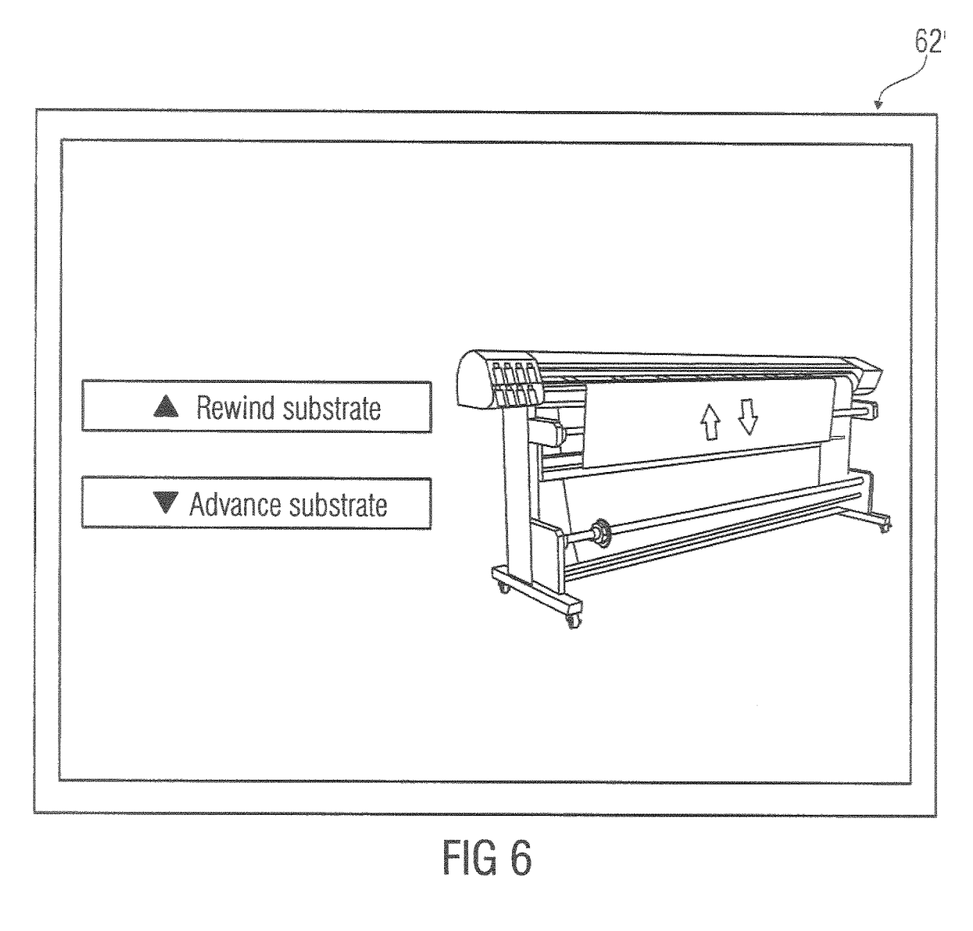
FIG. 6 is a simplified picture of a user interface according to an example.

Referring now to FIG. 6 there is shown a simplified picture of a user interface 62' according to an example. The user interface 62' presents an option for rewinding a substrate and an option for advancing the substrate to the user. The substrate may be, for example, the first or the second print. By rewinding or advancing the print, the print may be moved with respect to the sensor arrangement, e.g., parallel to the direction 56. In other examples, the user interface may in addition provide an option to guide the sensor arrangement with respect to the print inserted. In other examples, the user may in addition be provided with an option to select an actual relative position between the sensor arrangement and the respective print as a user-selected arbitrary position. For example, the sensor arrangement and/or the print may change their relative position with respect to each other according to a predefined pattern or randomly. For example, the user may observe the relative position at the printer. The user may select an actual (observed) position as the user-selected arbitrary position.

It would be appreciated that examples described herein can be realized in the form of hardware, machine readable instructions or a combination or hardware and machine readable instructions. Any such machine readable instructions may be stored in the form of volatile or non-volatile storage such as, for example, a storage device such as a ROM, whether erasable or rewritable or not, or in the form of memory such as, for example, RAM, memory chips device or integrated circuits or an optically or magnetically readable medium such as, for example, a CD, DVD, magnetic disc or magnetic tape. It would be appreciated that these storage devices and storage media are examples of machine readable storage that are suitable for storing a program or programs that, when executed, implement examples described herein.

All of the features disclosed in the specification (including any accompanying claims, abstract and drawings) and/or all of the features of any method or progress disclosed may be combined in any combination, except combinations where at least some of such features are mutually exclusive.

Each feature disclosed in the specification (including any accompanying claims, abstract and drawings) may be replaced by alternative features serving the same, equivalent or similarly proposed, unless expressly stated otherwise. Thus, unless expressly stated otherwise, each feature disclosed is one example only of a generic series of equivalent or similar features.

The invention claimed is:

1. A method comprising:
    detecting a first color at a user-selected arbitrary position of a first print;
    receiving, in a user interface that displays an image of a second print printed by a printer, a user-selected arbitrary position of the second print;
    detecting a second color at the user-selected arbitrary position of the second print printed by the printer;
    determining, by a controller, a color difference between the first color and the second color; and
    changing, by the controller, a setting of the printer to reduce the color difference in a further print printed by the printer.

2. The method of claim 1, wherein the user-selected arbitrary position of the first print and the user-selected arbitrary position of the second print are regions intended to have the same color.

3. The method of claim 1, comprising adjusting a relative position between a sensor arrangement and the second print based on a user input in the user interface specifying the user-selected arbitrary position of the second print.

4. The method of claim 3, wherein the user interface comprises a graphical user interface.

5. The method of claim 3, wherein adjusting the relative position between the sensor arrangement and the second print comprises moving the sensor arrangement along an axis.

6. The method of claim 5, wherein the moving of the sensor arrangement along the axis is responsive to a control of an actuator by the controller.

7. The method of claim 1, comprising printing the first print by the printer prior to an event, and printing the second print after the event, wherein the event comprises a change or a modification of a component of the printer.

8. The method of claim 1, comprising printing the first print by a second printer and providing the first print to the printer such that a color difference between the first color printed by the second printer and the second color printed by the printer is reduced in the further print.

9. The method of claim 1, further comprising:
    detecting a third color at a second user-selected arbitrary position of the first print;
    detecting a fourth color at a second user-selected arbitrary position of the second print;
    determining a further color difference between the third color and the fourth color; and
    changing the setting of the printer to reduce the further color difference in the further print printed by the printer.

10. The method of claim 1, wherein changing the setting of the printer comprises adapting a color to be printed based on the determined color difference or adapting a conversion information defining a conversion of the color to be printed into a color space of the printer.

11. The method of claim 1, further comprising:
    obtaining a first Lab value of the first color;
    obtaining a second Lab value of the second color;
    wherein the color difference between the first color and the second color is determined as a color difference between the first Lab value and the second Lab value.

12. The method of claim 1, further comprising:
    storing an information related to the first color in a memory of the printer;
    detecting a further color at a user-selected arbitrary position of the further print printed by the printer; and changing the setting of the printer related to the first color to reduce a color difference between the further color and the first color in an additional print printed by the printer.

13. The method of claim 1, where the user-selected arbitrary position of the second print is based on a user-selected selection made on the image of the second print in the user interface.

14. A printer comprising:
a sensor arrangement to detect a color of a print, wherein a position of the sensor arrangement relative to the print is adjustable;
a user interface enabling a user to adjust a relative position between the sensor arrangement and the print and to select this relative position as a user-selected arbitrary position; and
a controller to:
 determine a color difference between a first color detected at a user-selected arbitrary position of a first print and a second color detected at a user-selected arbitrary position of a second print; and
 change settings of the printer to reduce the color difference in further prints printed by the printer.

15. The printer of claim 14, further comprising:
an actuator to selectively move the sensor arrangement with respect to the second print along a first direction based on a user input in the user interface.

16. The printer of claim 14, wherein the user interface further is to present information about the position of the sensor arrangement relative to the second print.

17. The printer of claim 16, wherein the information is a presentation of a portion of the second print at which the sensor arrangement is located or a presentation of at least a portion of the second print and the sensor arrangement.

18. The printer of claim 14, wherein the user interface is to display an image of the second print, and the controller is to receive a user selection made in the user interface of the user-selected arbitrary position of the second print.

19. The printer of claim 18, wherein the user selection of the user-selected arbitrary position of the second print is made based on a user selection on the image of the second print displayed by the user interface.

20. A non-transitory machine-readable storage medium storing instructions that upon execution cause a controller of a printer to:
receive a first color at a user-selected arbitrary position of a first print;
receive, in a user interface that displays an image of a second print printed by a printer, a user-selected arbitrary position of the second print;
receive a second color at the user-selected arbitrary position of the second print printed by the printer;
determine a color difference between the first color and the second color; and
change a setting of the printer to reduce the color difference in a further print printed by the printer.

* * * * *

UNITED STATES PATENT AND TRADEMARK OFFICE
CERTIFICATE OF CORRECTION

PATENT NO. : 10,183,497 B2
APPLICATION NO. : 15/542832
DATED : January 22, 2019
INVENTOR(S) : Antonio Gracia Verdugo et al.

It is certified that error appears in the above-identified patent and that said Letters Patent is hereby corrected as shown below:

On the Title Page

In Column 1, item (71), Applicant, Lines 1-4, delete "Antonio Gracia Verdugo, Barcelona (ES); Juan Uroz Soria, Terrassa (ES); Oriol Borrell Avila, Sabadell (ES);" and insert -- HEWLETT-PACKARD DEVELOPMENT COMPANY, L.P., HOUSTON, TX --, therefor.

Signed and Sealed this
Twenty-eighth Day of May, 2019

Andrei Iancu
*Director of the United States Patent and Trademark Office*